(12) United States Patent
Yamamoto et al.

(10) Patent No.: US 11,156,266 B2
(45) Date of Patent: Oct. 26, 2021

(54) GEAR DEVICE

(71) Applicant: SUMITOMO HEAVY INDUSTRIES, LTD., Tokyo (JP)

(72) Inventors: Akira Yamamoto, Kanagawa (JP); Mitsuhiro Tamura, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/667,182

(22) Filed: Oct. 29, 2019

(65) Prior Publication Data

US 2020/0200235 A1      Jun. 25, 2020

(30) Foreign Application Priority Data

Dec. 20, 2018  (JP) .............................. JP2018-238077

(51) Int. Cl.
*F16H 1/32* (2006.01)
(52) U.S. Cl.
CPC ..................................... *F16H 1/32* (2013.01)
(58) Field of Classification Search
CPC ... F16H 1/10; F16H 1/32; F16H 37/04; F16H 55/06; F16H 55/17; F16H 57/08; F16H 57/028; F16H 57/029
USPC ........................................................ 475/162
See application file for complete search history.

(56) References Cited

U.S. PATENT DOCUMENTS

| | | | |
|---|---|---|---|
| 2,881,619 A * | 4/1959 | Fox | ........................... F16H 1/32 376/228 |
| 3,153,941 A | 10/1964 | Christian | |
| 7,819,770 B2 | 10/2010 | Haga et al. | |
| 2018/0320735 A1* | 11/2018 | Blomeke | ............... F16C 19/184 |

FOREIGN PATENT DOCUMENTS

| | | |
|---|---|---|
| DE | 10 2007 017 757 A1 | 1/2008 |
| JP | 2014-005900 A | 1/2014 |

OTHER PUBLICATIONS

Office Action issued in German Application No. 10 2019 128 006.0, dated Jan. 11, 2021.

* cited by examiner

*Primary Examiner* — Leslie A Nicholson, III
(74) *Attorney, Agent, or Firm* — Michael Best & Friedrich LLP (57) ABSTRACT

There is provided a gear device including an input shaft to which power is input, an internal gear, and an external gear. The input shaft has an input shaft hollow portion that extends in an axial direction, and an internal gear portion that meshes with an input pinion to be rotationally driven. The internal gear portion is configured so that the input pinion internally meshing with the internal gear portion and the input shaft hollow portion do not overlap each other when viewed in the axial direction.

7 Claims, 5 Drawing Sheets

GEAR DEVICE

RELATED APPLICATIONS

The content of Japanese Patent Application No. 2018-238077, on the basis of which priority benefits are claimed in an accompanying application data sheet, is in its entirety incorporated herein by reference.

BACKGROUND

Technical Field

Certain embodiments of the present invention relate to a gear device.

Description of Related Art

Gear devices are known which transmit and output power input from an input shaft via an internal gear and an external gear. Out of the gear devices configured in this way, a gear device is known in which the input shaft has a hollow structure, specifically, a hollow portion extending in an axial direction. The hollow structure can achieve an advantage that an elongated member such as a cable or a transmission shaft can be located in the hollow portion of the gear device.

FIG. 1 in the related art illustrates a configuration as follows. In an eccentric oscillating gear device having the hollow structure, internal teeth are disposed on an inner periphery of the hollow portion of the input shaft (center crank shaft). A gear of a motor internally meshes with the internal teeth of the input shaft.

SUMMARY

According to an embodiment of the present invention, there is provided a gear device including an input shaft to which power is input, an internal gear, and an external gear. The input shaft has an input shaft hollow portion that extends in an axial direction, and an internal gear portion that meshes with an input pinion to be rotationally driven. The internal gear portion is configured so that the input pinion internally meshing with the internal gear portion and the input shaft hollow portion do not overlap each other when viewed in the axial direction.

DETAILED DESCRIPTION

According to the eccentric oscillating gear device disclosed in the related art, the gear of the motor is present in the hollow portion of the input shaft. Consequently, even if the elongated member needs to be located in the hollow portion, the gear obstructs the location of the elongated member, thereby causing a disadvantage in that the advantage of the hollow structure is impaired.

It is desirable to provide a gear device having a hollow structure. In the gear device, an input pinion internally meshes with an input shaft so that power can be input to the input shaft, and an input shaft hollow portion can be effectively used.

According to the embodiment of the present invention, an advantageous effect can be achieved in that it is possible to provide a gear device in which an input pinion internally meshes with an input shaft so that power can be input to the input shaft, and an input shaft hollow portion can be effectively used.

Hereinafter, each embodiment of the present invention will be described in detail with reference to the drawings.

Embodiment

Figure 1:
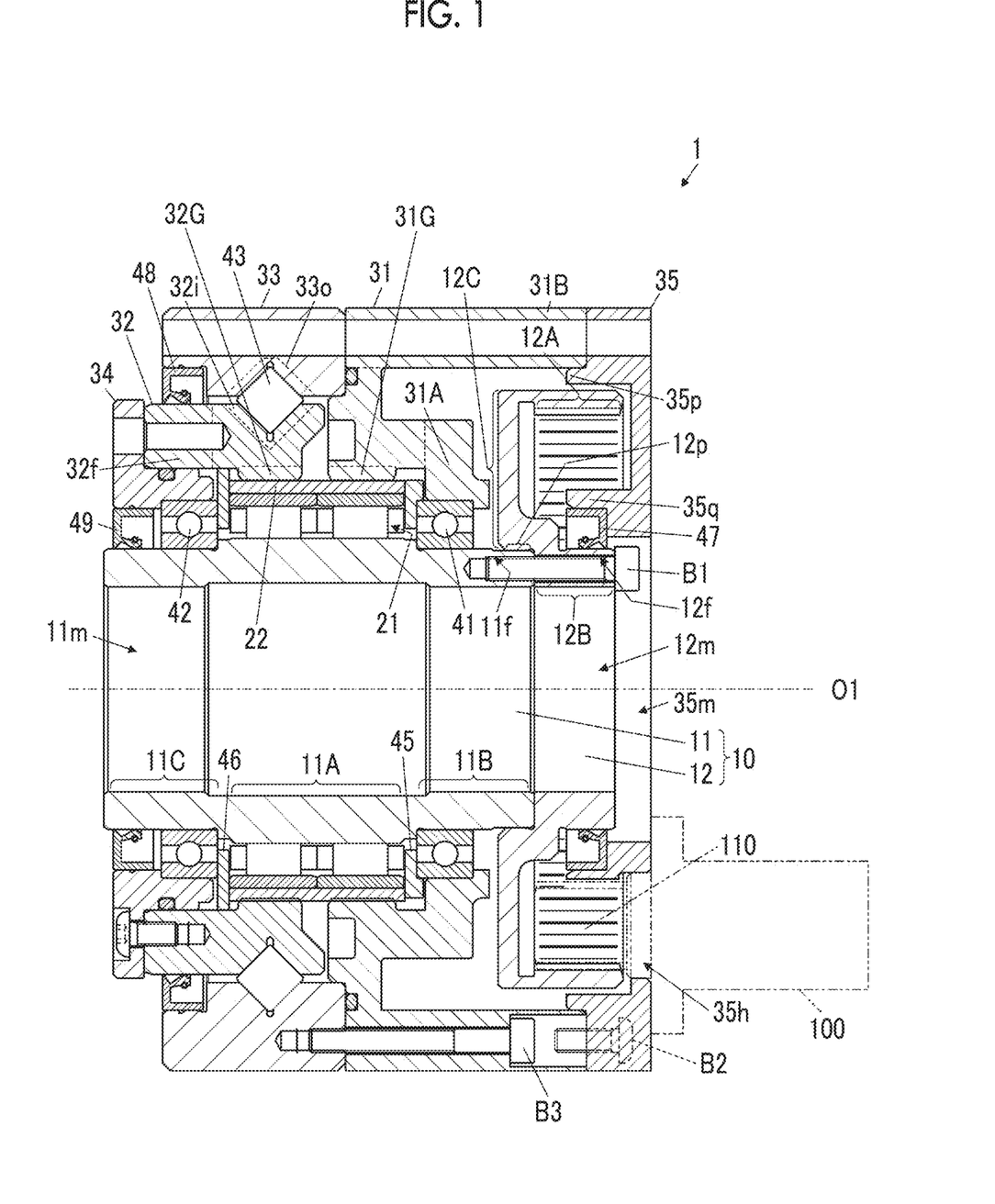
FIG. 1 is a sectional view illustrating a gear device according to an embodiment of the present invention.

FIG. 1 is a sectional view illustrating a gear device according to an embodiment of the present invention. In the present specification, a direction extending along a rotation axis O1 will be defined as an axial direction, a direction perpendicular to the rotation axis O1 will be defined as a radial direction, and a direction rotating around the rotation axis O1 will be defined as a circumferential direction. In the axial direction, a side on which a motor 100 is located will be referred to as an input side, and a side opposite thereto will be referred to as an output side.

A gear device 1 according to the embodiment is a reduction gear, and is specifically a flexible meshing gear device. The gear device 1 includes an input shaft 10 to which power of the motor 100 is input. The input shaft 10 receives the power of the motor 100, and rotates around the rotation axis O1. The motor 100 is connected to the gear device 1, and the power is transmitted to the input shaft 10 from an input pinion 110 to be rotationally driven. A pitch diameter, the number of teeth, and a size (module) of the teeth of the input pinion 110 are regulated by specifications of the gear device 1. In addition, the input pinion 110 may be regulated to be made of metal such as steel.

Figure 2:
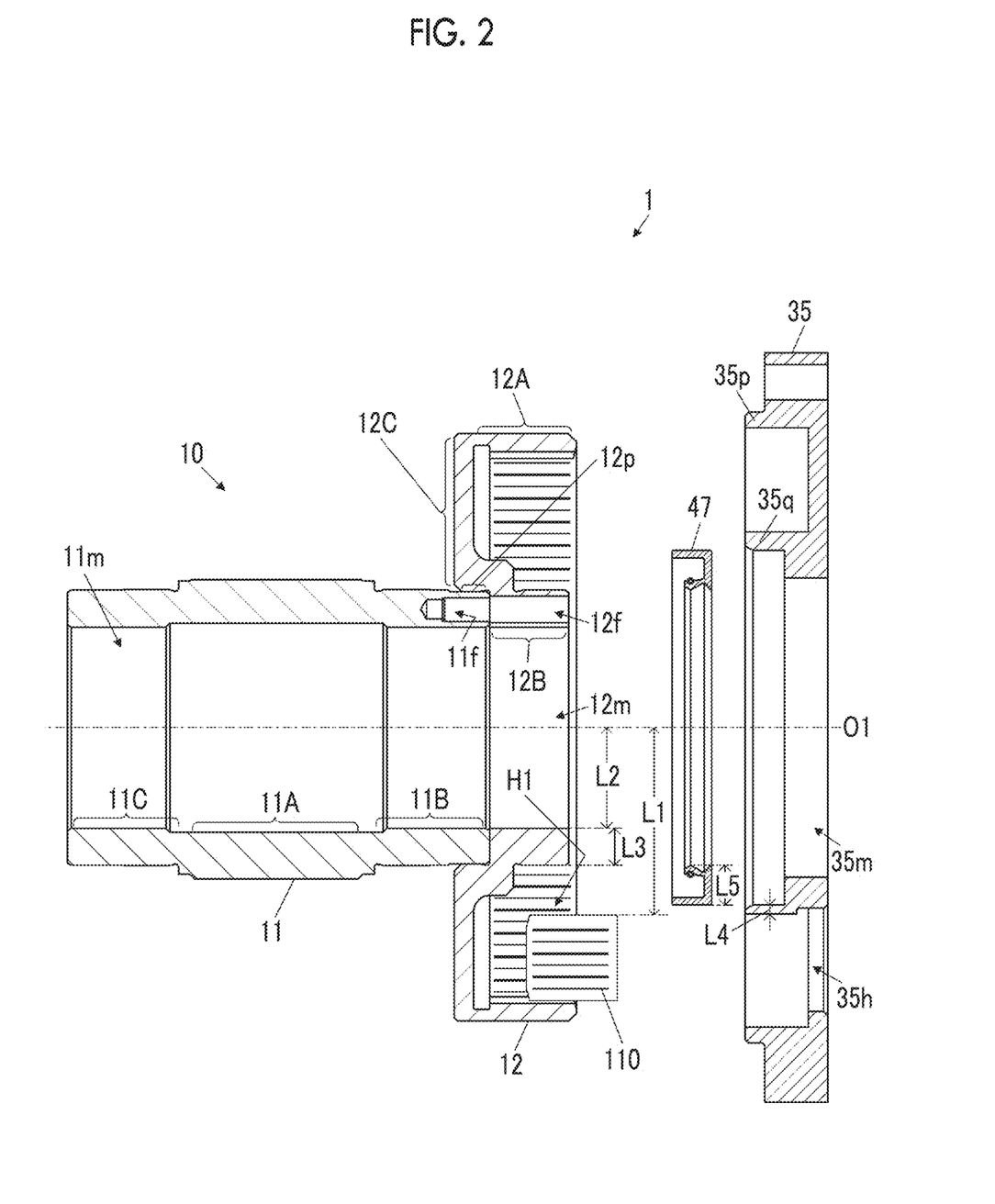
FIG. 2 illustrates an input shaft and an input side cover.

FIG. 2 illustrates the input shaft and an output shaft.

The input shaft 10 is configured so that a shaft main body 11 having a hollow portion 11m extending in the axial direction and a gear member 12 having a hollow portion 12m extending in the axial direction are connected to each other. The hollow portion 11m of the shaft main body 11 and the hollow portion 12m of the gear member 12 communicate with each other, thereby realizing a hollow structure (input shaft hollow portion) of the input shaft 10.

The shaft main body 11 has a wave generator 11A which has a non-circular (for example, substantially elliptical) outer shape in a cross section perpendicular to the rotation axis O1 and shaft portions 11B and 11C respectively disposed on both sides of the wave generator 11A in the axial direction. The shaft portions 11B and 11C have a circular outer shape in a cross section perpendicular to the rotation axis O1. The shaft main body 11 has a cylindrical shape, and a bolt hole 11f extending in the axial direction from an end surface on the input side is disposed in a side wall portion of the shaft main body 11. The bolt holes 11f are respectively disposed in a plurality of locations in the circumferential direction. The shaft main body 11 is made of metal such as steel. However, without being limited thereto, the shaft main body 11 may be made of iron-based metal other than steel, or may be made of metal other than the iron-based metal.

The gear member 12 includes an internal gear portion 12A having an internal tooth, a connection portion 12B to be connected to the shaft main body 11 by a connection member B1 such as a bolt, and an interposed portion 12C interposed between the internal gear portion 12A and the connection portion 12B so that both of these are connected to (integrated with) each other. The gear member 12 is made of a material having a smaller Young's modulus than a material of the input pinion 110 (for example, a resin or aluminum, but the material is not limited thereto). In the gear member 12, the internal gear portion 12A or the internal tooth portion may be made of a material (resin) having the small Young's modulus, and other portions may be made of metal such as steel.

The internal gear portion 12A has an annular shape having internal teeth in the inner peripheral portion. In a state where the internal gear portion 12A and the input pinion 110 mesh with each other, a shortest distance L1 from the rotation axis O1 to a tooth tip of the input pinion 110 (refer to FIG. 2) is greater than a radius L2 of the hollow portion 12m. In this manner, the input pinion 110 and the hollow portions 11m and 12m do not overlap each other when viewed in the axial direction. Furthermore, in a case where a space H1 (to be described later) is disposed in the internal gear portion 12A, the connection portion 12B which partitions an inner peripheral side of the space H1 is presents inside the input pinion 110 in the radial direction. In this case, the distance L1 is greater than a sum of the radius L2 of the hollow portion 12m and a thickness L3 in the radial direction of the connection portion 12B which partitions the inner peripheral side of the space H1. In addition, as will be described later, a configuration may be adopted as follows. A through-hole 35h into which the input pinion 110 is inserted is disposed in an input side cover 35, and an oil seal 47 is located between the input side cover 35 and the connection portion 12B of the gear member 12. In this case, the above-described distance L1 is greater than a sum of the radius L2 of the hollow portion 12m, the thickness L3 of the connection portion 12B, a thickness L4 in the radial direction of a wall body of a portion closest to the rotation axis O1 in a wall body surrounding the through-hole 35h, and a thickness (difference between an inner radius and an outer radius) L5 in the radial direction of the oil seal 47.

The connection portion 12B has a cylindrical shape, and an insertion hole 12f extending in the axial direction is disposed on a side wall portion of the connection portion 12B. The insertion holes 12f are respectively disposed at a plurality of locations in the circumferential direction, and respectively communicate with the bolt holes 11f of the shaft main body 11. The connection portion 12B is connected to the shaft main body 11 by the connection member B1 (bolt). The connection portion 12B and the internal tooth of the internal gear portion 12A overlap each other when viewed in the radial direction.

The interposed portion 12C has a form radially extending in the radial direction, for example, a disk-like form, and connects the connection portion 12B and the internal gear portion 12A to each other on one side (output side) in the axial direction. In this manner, the internal gear portion 12A, the connection portion 12B, and the interposed portion 12C are integrated with one another. The gear member 12 has a space H1 (FIG. 2) which is surrounded by the connection portion 12B, the internal gear portion 12A, and the interposed portion 12C in three directions, and which can enclose the input pinion 110. A spigot joint portion 12p fitted to the shaft portion 11B of the shaft main body 11 in a spigot joint manner is disposed inside the interposed portion 12C in the radial direction.

Figure 3:
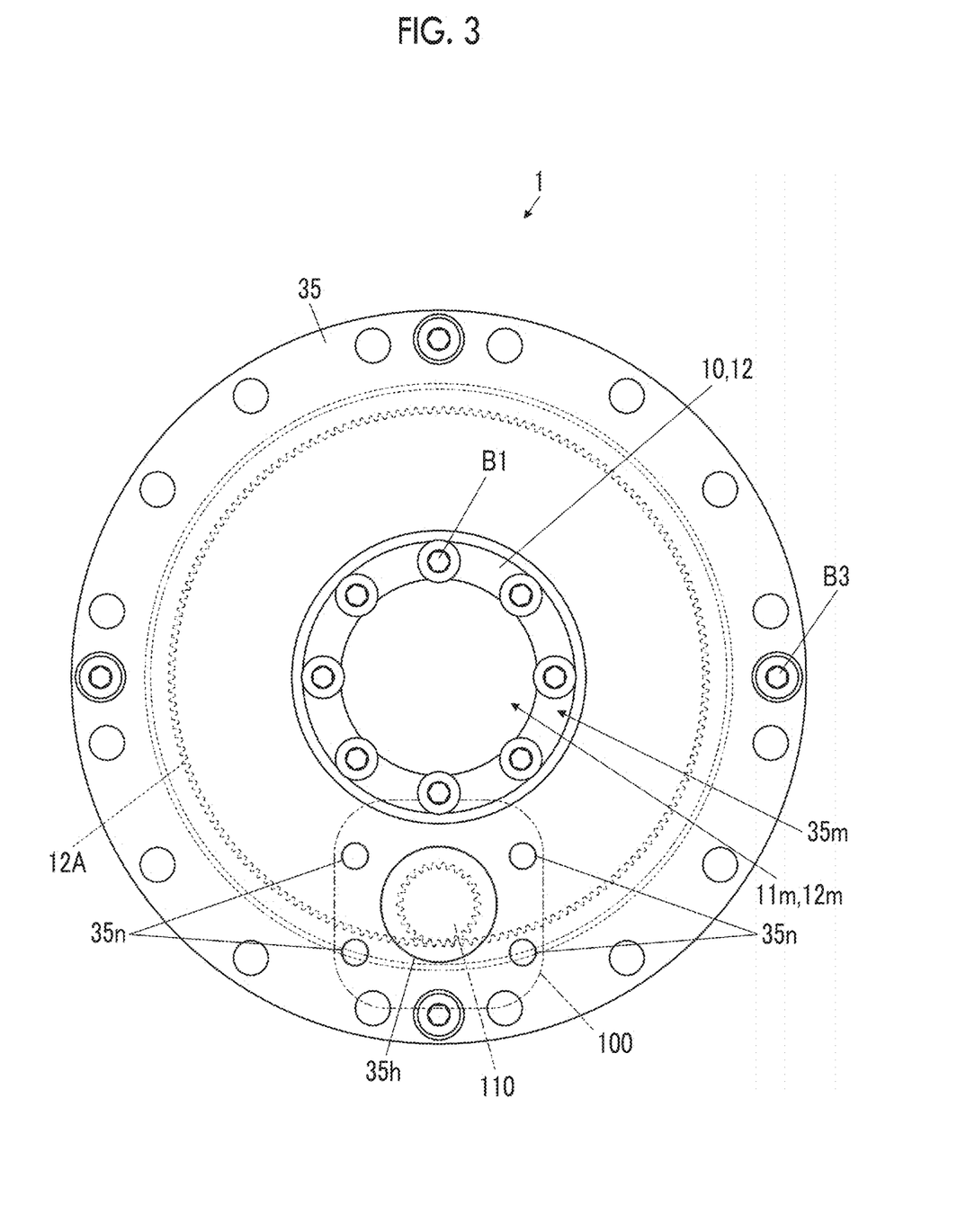
FIG. 3 is a front view when the gear device in FIG. 1 is viewed from an input side.
Figure 4:
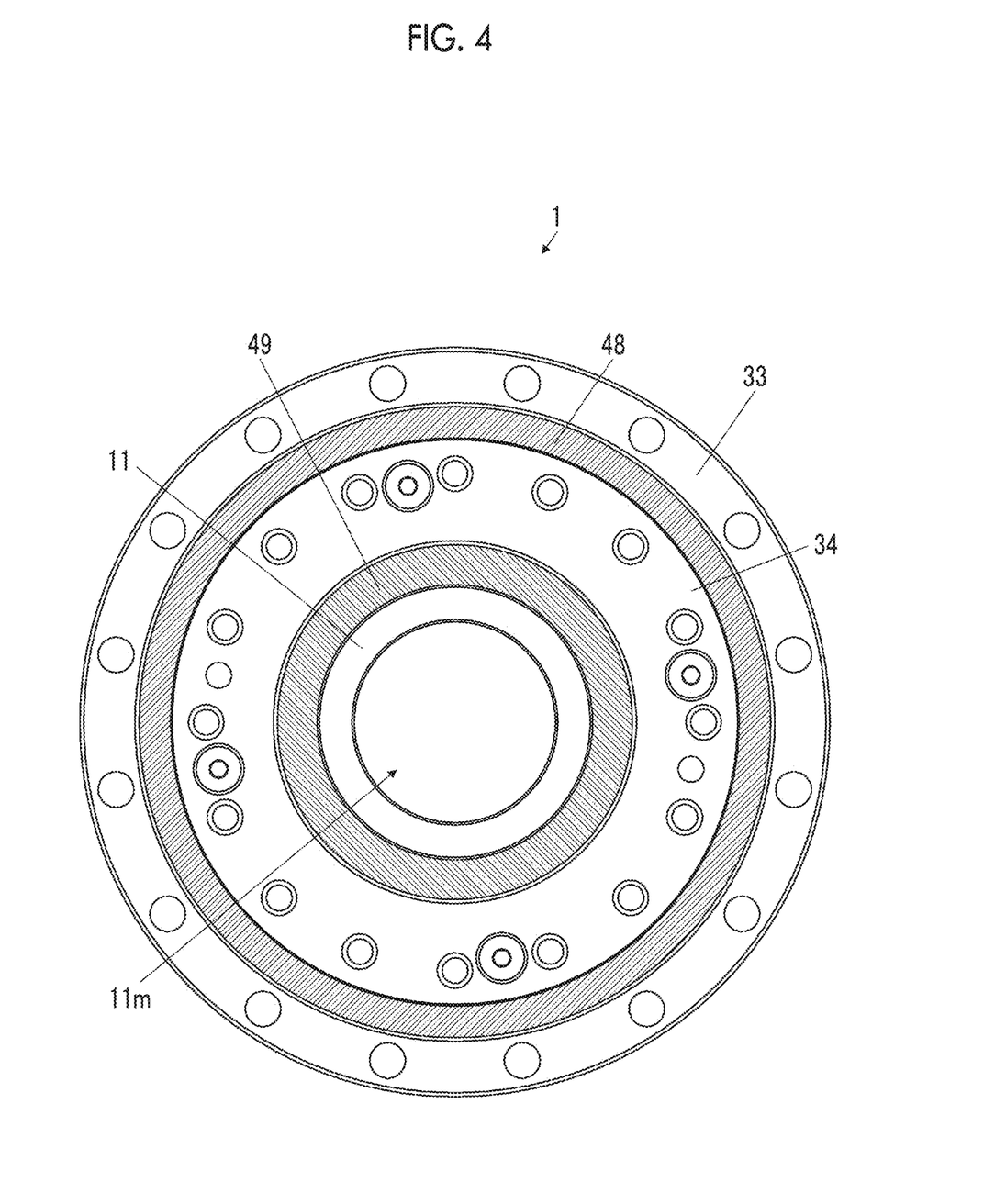
FIG. 4 is a front view when the gear device in FIG. 1 is viewed from an output side.

FIG. 3 is a front view when the gear device in FIG. 1 is viewed from the input side. FIG. 4 is a front view when the gear device in FIG. 1 is viewed from the output side.

As illustrated in FIGS. 1 to 3, the input side cover 35 closes the input side of the gear device 1 except for the hollow portions 11m and 12m. The input side cover 35 has a cover hollow portion 35m communicating with the hollow portions 11m and 12m of the input shaft 10. The cover hollow portion 35m encloses the hollow portions 11m and 12m of the input shaft 10 when viewed in the axial direction.

The input side cover 35 further has a through-hole 35h located outward of the cover hollow portion 35m in the radial direction. The through-hole 35h corresponds to an example of the input pinion hole according to the present invention. The through-hole 35h is disposed at one location in the circumferential direction, and has a size which enables the input pinion 110 to pass therethrough. One end portion of the motor 100 is fitted to the through-hole 35h, thereby positioning the motor 100. The input side cover 35 has a screw hole 35n (FIG. 3) for fixing the positioned motor 100 via the connection member such as a screw or a bolt. When the motor 100 is fixed, the input pinion 110 of the motor 100 meshes with the internal gear portion 12A of the input shaft 10.

The input side cover 35 further has a protruding portion 35p (FIG. 2) internally fitted to one end of an outer cylinder portion 31B of the first internal gear member 31 in a spigot joint manner, and a cylindrical protruding portion 35q (FIG. 2) facing the connection portion 12B of the input shaft 10 in the radial direction. The input side cover 35 is fixed to the outer cylinder portion 31B of the first internal gear member 31 at a plurality of locations in the circumferential direction by the connection member B2 (FIG. 1) such as a screw. The oil seal 47 seals a portion between the protruding portion 35q of the input side cover 35 and the connection portion 12B of the input shaft 10 so as to prevent a lubricant leakage. The oil seal 47, the connection portion 12B, and the internal gear portion 12A are located to overlap one another when viewed in the radial direction.

The input side cover 35 is thicker in the axial direction than a head portion of the connection member B1. The head portion of the connection member B1 is enclosed inside the cover hollow portion 35m, and does not protrude outward of an input side end surface of the input side cover 35.

As illustrated in FIG. 1, the gear device 1 further includes an external gear 22, two internal gears 31G and 32G, a wave generator bearing 21, a casing 33, an output side cover 34, an input side cover 35, bearings 41 and 42, a main bearing 43, stopper rings 45 and 46, and oil seals 47, 48, and 49.

The external gear 22 is a flexible cylindrical member, and has teeth on the outer periphery of the external gear 22.

For example, the wave generator bearing 21 is a roller bearing, and is located between the wave generator 11A and the external gear 22 so that the wave generator 11A and the external gear 22 are relatively rotatable.

The stopper rings 45 and 46 are respectively located on both sides in the axial direction of the external gear 22 and the wave generator bearing 21, and regulate the movement in the axial direction of the external gear 22 and the wave generator bearing 21.

The two internal gears 31G and 32G are aligned with each other in the axial direction, and mesh with the external gear 22. One internal gear 31G is configured so that teeth are disposed in a portion of the inner periphery of the first internal gear member 31. The other internal gear 32G is configured so that teeth are disposed in a portion of the inner periphery of the second internal gear member 32.

The first internal gear member 31 has an annular form, and is connected to the casing 33 by a connection member B3 such as a bolt. In addition to the internal gear 31G, the first internal gear member 31 has an extension portion 31A extending to a side opposite to the external gear 22 across the stopper ring 45. The bearing 41 is located between the extension portion 31A and the shaft portion 11B. The first internal gear member 31 further has an outer cylinder portion 31B extending in a cylindrical shape outward of the extension portion 31A in the radial direction and outward of the gear member 12 in the radial direction. The input side cover 35 is fitted to an end portion on the input side of the outer cylinder portion 31B.

The second internal gear member 32 has an annular form. In addition to the internal gear 32G, the second internal gear member 32 has an inner ring portion 32$i$ functioning as an inner ring of the main bearing 43, and a flange portion 32$f$ to be connected to a counterpart member serving as a power output destination.

The casing 33 covers the outer peripheral side of the internal gear 32G. The inner peripheral portion of the casing 33 has an outer ring portion 33$o$ of the main bearing 43, and the casing 33 rotatably supports the second internal gear member 32 via the main bearing 43. For example, the main bearing 43 is a cross roller bearing.

The output side cover 34 is connected to the second internal gear member 32, and covers a meshing portion between the external gear 22 and the internal gear 32G from the output side in the axial direction. The output side cover 34 and the second internal gear member 32 are connected to a counterpart member for outputting the power. A bearing 42 is located between the output side cover 34 and the shaft portion 11C of the input shaft 10, and the input shaft 10 is rotatably supported by the output side cover 34.

The oil seal 48 is located on the output side from the main bearing 43 between the casing 33 and the second internal gear member 32, and prevents a possibility that a lubricant may flow outward of the device from the portion therebetween. Another oil seal 49 is located on the output side from the bearing 42 between the output side cover 34 and the input shaft 10, and prevents a possibility that the lubricant may flow outward of the device from the portion therebetween.

Speed Reduction Operation

If the input pinion 110 is rotated by driving the motor 100, the speed of the rotational movement is reduced by the meshing between the internal gear portion 12A and the input pinion 110, and the reduced speed is transmitted to the input shaft 10. The input pinion 110 internally meshes with the internal gear portion 12A. Accordingly, the number of meshing teeth is larger than that in a case where the external teeth externally mesh with each other. In this manner, noise generated by meshing between the input pinion 110 and the internal gear portion 12A is reduced. Furthermore, the number of meshing teeth between the input pinion 110 and the internal gear portion 12A is larger, and the gear device 1 has a high reduction ratio. Accordingly, a torque transmitted to the internal gear portion 12A from the input pinion 110 is small. Therefore, for example, as a material of the teeth of the internal gear portion 12A, a material having a small Young's modulus such as a resin can be adopted. In this manner, noise generated by meshing between the input pinion 110 and the internal gear portion 12A can be reduced.

If the input shaft 10 rotates, the movement of the wave generator 11A is transmitted to the external gear 22. In this case, the external gear 22 is regulated to have a shape along the outer peripheral surface of the wave generator 11A, and is bent into an elliptical shape having a long shaft portion and a short shaft portion when viewed in the axial direction. Furthermore, the external gear 22 meshes with the internal tooth of the fixed first internal gear member 31 in the long shaft portion. Therefore, the external gear 22 does not rotate at the same rotational speed as that of the wave generator 11A, and the wave generator 11A relatively rotates inside the external gear 22. Then, in accordance with the relative rotation, the external gear 22 is bent and deformed so that a major axis position and a minor axis position move in the circumferential direction. A period of the deformation is proportional to a rotation period of the input shaft 10.

When the external gear 22 is bent and deformed, the major axis position moves. In this manner, the meshing position between the external gear 22 and the internal gear 31G is changed in a rotation direction. Here, if the number of teeth of the external gear 22 is 100 and the number of teeth of the internal gear 31G is 102, each time the meshing position turns one round, the meshing teeth between the external gear 22 and the internal gear 31G are shifted. In this manner, the external gear 22 rotates (revolves). In a case of the above-described number of teeth, the speed of the rotational movement of the input shaft 10 is reduced at a reduction ratio of 100:2, and the reduced speed is transmitted to the external gear 22.

On the other hand, the external gear 22 meshes with the other internal gear 32G. Accordingly, the meshing position between the external gear 22 and the internal gear 32G is also changed in the rotational direction by the rotation of the input shaft 10. On the other hand, the number of teeth of the internal gear 32G and the number of teeth of the external gear 22 coincide with each other. Accordingly, the external gear 22 and the internal gear 32G do not rotate relative to each other. The speed of the rotational movement of the external gear 22 is transmitted to the internal gear 32G at a reduction ratio of 1:1. As a result, the speed of the rotational movement of the input shaft 10 is reduced at a reduction ratio of 100:2, and the reduced speed is transmitted to the second internal gear member 32 and the output side cover 34. Then, the speed-reduced rotational movement is output to a counterpart member.

As described above, according to the gear device 1 of the embodiment, whereas the input shaft 10 has the hollow structure (hollow portions 11$m$ and 12$m$), the input shaft 10 has the internal gear portion 12A with which the input pinion 110 internally meshes. Furthermore, the internal gear portion 12A has a configuration in which the hollow portions 11$m$ and 12$m$ and the input pinion 110 do not overlap each other when viewed in the axial direction. The power is input to the input shaft 10 from the internally meshing input pinion 110. Accordingly, noise generated by the meshing between the teeth when the power is input thereto can be more significantly reduced compared to the meshing between the external teeth. Furthermore, the input pinion 110 does not block the hollow portions 11$m$ and 12$m$ of the hollow structure. Accordingly, it is possible to achieve an advantage in that the hollow structure of the gear device 1 can be effectively used. For example, the gear device 1 can be operated using an elongated member through the hollow portions 11$m$ and 12$m$.

Furthermore, according to the gear device 1 of the embodiment, the gear device 1 includes the input side cover 35 which closes the input side except for the hollow portions 11$m$ and 12$m$. Furthermore, the input side cover 35 has the cover hollow portion 35$m$ communicating with the hollow portions 11$m$ and 12$m$ of the input shaft 10, and the through-hole 35$h$ into which the input pinion 110 is inserted.

Therefore, a transmitting portion of the movement from the input pinion 110 to the input shaft 10 can be closed by the input side cover 35. The closing can significantly reduce the noise generated by the meshing between the teeth when the power is input thereto without obstructing the hollow structure. In addition, the meshing portion between the input pinion 110 and the internal gear portion 12A is closed. Accordingly, it is possible to prevent a lubricant leakage from the meshing portion, and to prevent dust from entering the meshing portion.

Furthermore, according to the gear device 1 of the embodiment, the internal gear portion 12A with which the input pinion 110 meshes is made of a material having a smaller Young's modulus than a material of the input pinion 110. For example, whereas the input pinion 110 is made of metal, the internal gear portion 12A is made of a resin. This configuration can be realized in such a way that the number of meshing teeth is increased by the internally meshing input pinion 110. Then, according to this configuration, an advantageous effect can be achieved in that noise generated by the meshing between both of these can be significantly reduced.

Furthermore, according to the gear device 1 of the embodiment, the input shaft 10 is configured so that the shaft main body 11 and the gear member 12 are connected to each other. Furthermore, the gear member 12 is configured to include the connection portion 12B, the internal gear portion 12A, and the interposed portion 12C connecting both of these to each other. The connection portion 12B and the internal gear portion 12A are located to overlap each other when viewed in the radial direction. According to this configuration, the input pinion 110 can be located between the connection portion 12B and the internal gear portion 12A. The input pinion 110 and the internal gear portion 12A can mesh with each other. Furthermore, compared to a configuration in which the connection portion 12B and the internal gear portion 12A are aligned with each other in the axial direction, a dimension of the gear member 12 in the axial direction can be shortened. Therefore, a dimension of the gear device 1 in the axial direction can be shortened.

Further, according to the gear device 1 of the embodiment, the inner peripheral portion of the interposed portion 12C of the gear member 12 and the shaft main body 11 are fitted to each other in a spigot joint manner. In this manner, the shaft main body 11 and the gear member 12 can be very accurately aligned with each other, and vibration or noise generated due to misalignment can be reduced.

Furthermore, according to the gear device 1 of the embodiment, the oil seal 47 located between the input shaft 10 and the input side cover 35, the connection portion 12B of the gear member 12 in the input shaft 10, and the internal tooth of the internal gear portion 12A are located to overlap with one another when viewed in the radial direction. In this manner, the meshing portion between the input pinion 110 and the internal gear portion 12A can be sealed so that the lubricant does not leak out therefrom. Furthermore, compared to a configuration in which the oil seal 47 is located by being shifted from the connection portion 12B in the axial direction, an advantageous effect can be achieved in that the dimension of the gear device 1 in the axial direction can be shortened.

Modification Example

In the embodiment, a configuration in which the present invention is applied to a so-called cylindrical type flexible meshing gear device 1 has been described as an example. However, the present invention is applicable to various gear devices. For example, the present invention is similarly applicable to a so-called cup type or silk hat type flexible meshing gear device, a simple planetary gear device, and a center crank type eccentric oscillating reduction gear. Furthermore, the present invention is similarly applicable to a so-called distribution type eccentric oscillating reduction gear in which two or more eccentric body shafts (eccentric planetary shafts) each having an eccentric body are located offset from the axis of the gear device.

For example, in a case where the present invention is applied to the simple planetary gear device, a sun gear shaft to be integrated with a sun gear is configured to have a large diameter as an example. A hollow portion of the hollow structure extending in the axial direction and communicating with the sun gear shaft is disposed in the simple planetary gear device. Furthermore, the sun gear shaft is extended in the axial direction. Similarly to the input shaft 10 according to the embodiment, the internal gear portion meshing with the input pinion from the motor is disposed in the sun gear shaft. In addition, the internal gear portion is configured to have a size in which the hollow portion of the hollow structure and the input pinion do not overlap each other when viewed in the axial direction. According to this configuration, even in a case of the simple planetary gear device, the effective use of the hollow structure is not hindered. The input pinion is caused to internally mesh with the sun gear shaft. In this manner, noise generated from the meshing portion can be significantly reduced.

In a case where the present invention is applied to the center crank type eccentric oscillating reduction gear, as illustrated in FIG. 1 disclosed in the related art, a hollow portion (33) extending in the axial direction is disposed in a center crank shaft (3) so as to form the hollow structure, as an example. Furthermore, the center crank shaft (3) is extended in the axial direction. Similarly to the input shaft 10 according to the embodiment, the internal gear portion meshing with the input pinion from the motor is disposed in the center crank shaft (3). In addition, the internal gear portion is configured to have a size in which the hollow portion (33) of the hollow structure and the input pinion do not overlap each other when viewed in the axial direction.

The reference numerals in parentheses in this paragraph indicate the reference numerals in the related art. According to this configuration, even in a case of the center crank type eccentric oscillating reduction gear, the effective use of the hollow structure is not hindered. The input pinion is caused to internally mesh with the center crank shaft. In this manner, noise generated from the meshing portion can be significantly reduced.

Figure 5:
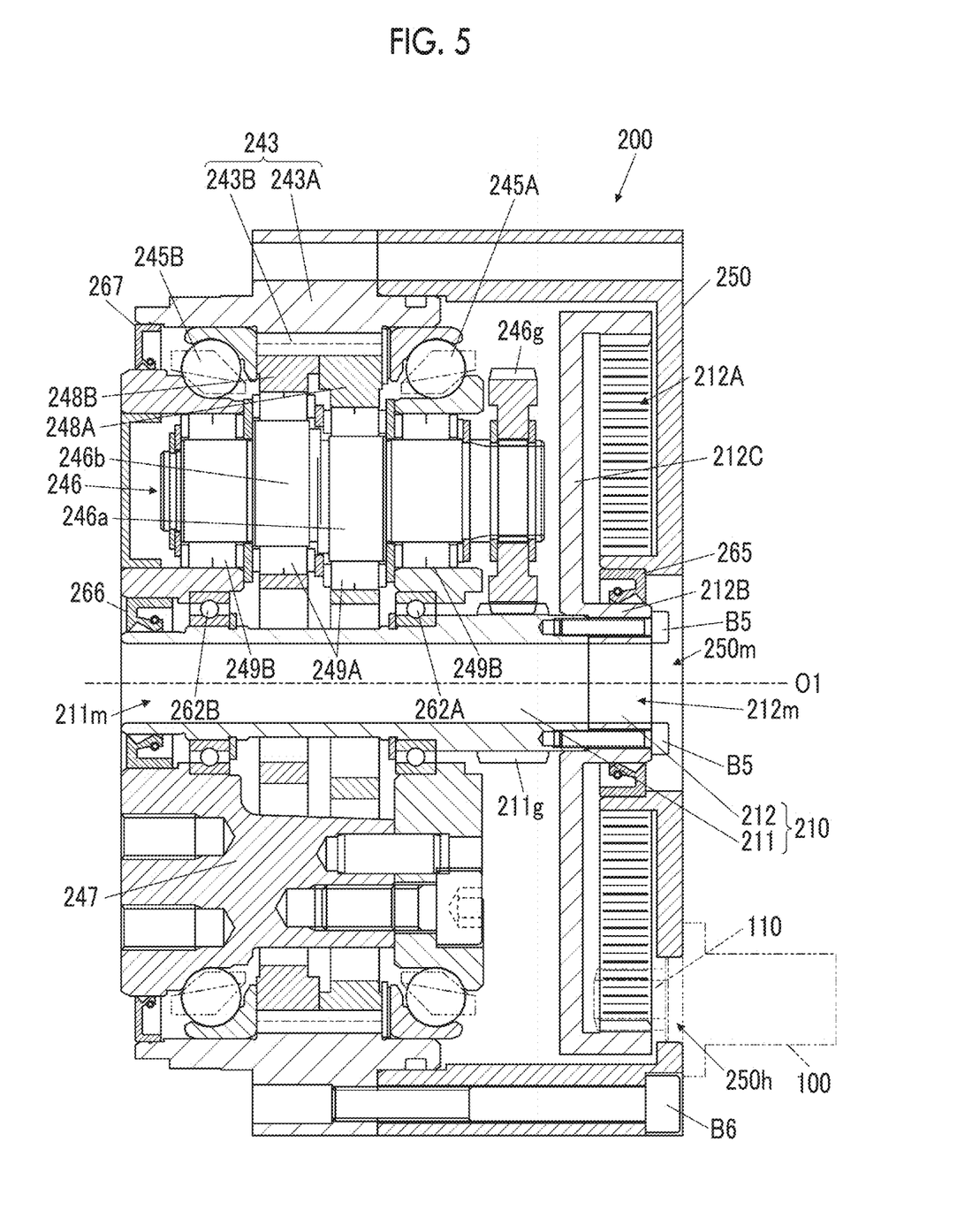
FIG. 5 is a sectional view illustrating an embodiment in which the present invention is applied to a distribution type eccentric oscillating reduction gear.

FIG. 5 is a sectional view illustrating an embodiment in which the present invention is applied to a distribution type eccentric oscillating reduction gear. In a case where the present invention is applied to the distribution type eccentric oscillating reduction gear, a configuration illustrated in FIG. 5 can be adopted as an example. An eccentric oscillating reduction gear 200 in FIG. 5 includes an input shaft 210 in which a shaft main body 211 and a gear member 212 are connected to each other. The gear member 212 of the input shaft 210 includes an internal gear portion 212A, a connection portion 212B, and an interposed portion 212C. These are configured similarly to the internal gear portion 12A, the connection portion 12B, and the interposed portion 12C according to the above-described embodiment. The shaft main body 211 of the input shaft 210 and the gear member 212 are connected to each other by a connection member B5 via a connection portion 212B.

The eccentric oscillating reduction gear 200 further has an eccentric planetary shaft 246 having eccentric bodies 246a and 246b, a first external gear 248A in which the eccentric body 246a is inserted into a through-hole offset from the axis, and a second external gear 248B in which the eccentric body 246b is inserted into a through-hole offset from the axis. The respective through-holes of the external gear 248A and 248B are disposed at a plurality of locations (for example, three locations) in the circumferential direction. A plurality of the eccentric planetary shafts 246 are respectively inserted into the through-holes. The eccentric bodies 246a and 246b are respectively located in the through-holes of the external gears 248A and 248B so as to be rotatable via a bearing 249A for the eccentric body. The input shaft 210 has a transmission gear 211g disposed in the outer peripheral portion of the input shaft 210, and meshes with a planetary gear 246g connected to the eccentric planetary shaft 246.

Furthermore, the eccentric oscillating reduction gear 200 includes a carrier 247 supporting a plurality of the eccentric planetary shafts 246 via a bearing 249B, and an internal gear 243 meshing with the external gears 248A and 248B. The internal gear 243 has a plurality of outer pins 243B functioning as the internal teeth, and an annular internal gear main body 243A. The internal gear main body 243A has a pin groove rotatably holding the plurality of outer pins 243B in the inner peripheral portion. The plurality of outer pins 243B are held in the plurality of pin grooves. The carrier 247 is in synchronization with the movement of the revolving component of the external gears 248A and 248B via the eccentric planetary shaft 246.

Furthermore, the eccentric oscillating reduction gear 200 has main bearings 245A and 245B located between the internal gear 243 and the carrier 247, and bearings 262A and 262B located between the input shaft 210 and the carrier 247. In a case where the internal gear 243 is supported by an external mechanism, the carrier 247 is rotatably supported by the internal gear 243 via the main bearings 245A and 245B. Furthermore, the input shaft 210 is rotatably supported by the carrier 247 via the bearings 262A and 262B. The carrier 247 is connected to a counterpart member for outputting the speed-reduced movement, for example.

Furthermore, the eccentric oscillating reduction gear 200 includes an input side cover 250 which closes the input side of the eccentric oscillating reduction gear 200 except for hollow portions 211m and 212m. The input side cover 250 is connected to the internal gear main body 243A by a connection member B6 such as a bolt, and covers the input side of the eccentric oscillating reduction gear 200 and the outer periphery on the input side of the eccentric planetary shaft 246. The input side cover 250 has a cover hollow portion 250m communicating with the hollow portions 211m and 212m of the input shaft 210, and a through-hole (equivalent to the input pinion hole) 250h into which the input pinion 110 of the motor 100 is inserted. The motor 100 is attached to the input side cover 250 similarly to the above-described embodiment. In this case, the input pinion 110 meshes with the internal gear portion 212A of the gear member 212.

Furthermore, the eccentric oscillating reduction gear 200 has an oil seal 265 which seals a portion between the input shaft 210 and the input side cover 250 on the input side, an oil seal 266 which seals a portion between the input shaft 210 and the carrier 247 on the output side, and an oil seal 267 which seals a portion between the internal gear main body 243A and the carrier 247.

According to this configuration, if the input pinion 110 is rotated by driving the motor 100, the movement is transmitted via the internal gear portion 212A internally meshing with the input pinion 110, and the input shaft 210 is rotated around the rotation axis O1. The power is input by the meshing between the input pinion 110 and the internal gear portion 212A. In this manner, the same operation as that of the above-described embodiment is realized. Accordingly, it is possible to significantly prevent noise from being generated in a portion to which the power is input.

If the input shaft 210 rotates, the rotational movement is transmitted to the eccentric planetary shaft 246 via the transmission gear 211g and the planetary gear 246g. Then, the eccentric bodies 246a and 246b rotate, thereby causing the external gears 248A and 248B to eccentrically oscillate. Due to the eccentric oscillation, the meshing position between the external gears 248A and 248B and the internal gear 243 is changed in the circumferential direction, and the number of teeth is different between them so that the external gears 248A and 248B rotate (revolve). The revolving component of the external gears 248A and 248B is output to a counterpart member via the carrier 247.

Even in a case of the eccentric oscillating reduction gear 200 configured in this way, the effective use of the hollow structure of the input shaft 210 is not hindered. The input pinion 110 is caused to internally mesh with the input shaft 210. In this manner, noise generated from the meshing portion can be significantly reduced.

Hitherto, the embodiments according to the present invention have been described. However, the present invention is not limited to the above-described embodiments. For example, in the above-described embodiment, an example has been described as follows. At least the internal tooth portion of the internal gear portion 12A of the input shaft 10 is made of the material having the smaller Young's modulus than the material of the input pinion 110, for example, such as a resin. However, without being limited thereto, the internal tooth portion of the internal gear portion 12A may be made of a material whose Young's modulus is equal to or greater than the material of the input pinion 110. Even in this case, the input pinion 110 internally meshes with the input shaft 210. In this manner, it is possible to reduce noise generated from the meshing portion between the internal gear portion 12A and the input pinion 110. In addition, in the embodiment, a specific example is illustrated and described. However, in the embodiment, configuration elements integrally formed of a single member may be substituted with configuration elements which are divided into a plurality of members so as to be connected or fixed to each other. In addition, configuration elements configured so that a plurality of members are connected to each other may be substituted with configuration elements integrally formed of a single member. Alternatively, details described in the embodiments can be appropriately modified within a scope that does not depart from the gist of the invention.

It should be understood that the invention is not limited to the above-described embodiment, but may be modified into various forms on the basis of the spirit of the invention. Additionally, the modifications are included in the scope of the invention.

What is claimed is:

1. A gear device comprising:
   an input shaft to which power is input;
   an internal gear; and
   an external gear,
   wherein the input shaft has
      an input shaft hollow portion that extends in an axial direction, and an internal gear portion that meshes with an input pinion to be rotationally driven, and wherein the input pinion internally meshing with the internal gear portion is configured so as not to overlap the input shaft hollow portion when viewed in the axial direction.

2. The gear device according to claim 1, further comprising:

an input side cover that covers at least a portion on an input side of the gear device, wherein the input side cover has a cover hollow portion communicating with the input shaft hollow portion, and an input pinion hole which is disposed at an outward position of the cover hollow portion in a radial direction, and into which the input pinion is inserted.

3. The gear device according to claim 1, wherein the internal gear portion is made of a material having a smaller Young's modulus than a material of the input pinion.

4. The gear device according to claim 1, wherein the input pinion is made of metal, and the internal gear portion is made of a resin.

5. The gear device according to claim 1, wherein the input shaft is configured so that a shaft main body and a gear member including the internal gear portion are connected to each other, wherein the gear member has a connection portion to be connected to the shaft main body, and an interposed portion interposed between the internal gear portion and the connection portion, and wherein an internal tooth of the internal gear portion and the connection portion overlap each other in a radial direction.

6. The gear device according to claim 5, wherein an inner periphery of the interposed portion and an outer periphery of the shaft main body are fitted to each other in a spigot joint manner.

7. The gear device according to claim 5, further comprising:

an oil seal located on an outer periphery of the connection portion, wherein an internal tooth of the internal gear portion, the connection portion, and the oil seal overlap one another when viewed in the radial direction.

\* \* \* \* \*